(12) United States Patent
Yamada et al.

(10) Patent No.: US 9,705,122 B2
(45) Date of Patent: Jul. 11, 2017

(54) BATTERY TERMINAL WITH UNINTENDED DEFORMATION PREVENTION FEATURES

(71) Applicant: Sumitomo Wiring Systems, Ltd., Yokkaichi, Mie (JP)

(72) Inventors: Ryosuke Yamada, Mie (JP); Takamaru Amano, Mie (JP); Yuichi Nakanishi, Mie (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 15/123,008

(22) PCT Filed: Feb. 18, 2015

(86) PCT No.: PCT/JP2015/054364
§ 371 (c)(1),
(2) Date: Sep. 1, 2016

(87) PCT Pub. No.: WO2015/133268
PCT Pub. Date: Sep. 11, 2015

(65) Prior Publication Data
US 2017/0077482 A1     Mar. 16, 2017

(30) Foreign Application Priority Data
Mar. 4, 2014  (JP) .................................. 2014-041493

(51) Int. Cl.
*H01R 4/38*  (2006.01)
*H01M 2/30*  (2006.01)
(Continued)

(52) U.S. Cl.
CPC .............. *H01M 2/305* (2013.01); *H01R 4/42* (2013.01); *H01M 2220/20* (2013.01);
(Continued)

(58) Field of Classification Search
CPC .. H01R 13/207; H01R 13/621; H01R 11/283; H01R 11/285
(Continued)

(56) References Cited

U.S. PATENT DOCUMENTS 5,445,907 A * 8/1995 Ito ........................ H01R 11/283
429/178
5,558,544 A    9/1996 Okada et al.

FOREIGN PATENT DOCUMENTS

JP    6-48166    6/1994
JP    2004-186093    7/2004
(Continued)

OTHER PUBLICATIONS

International Search Report.

*Primary Examiner* — Hae Moon Hyeon
*Assistant Examiner* — Justin Kratt
(74) *Attorney, Agent, or Firm* — Gerald E. Hespos; Michael J. Porco; Matthew T. Hespos

(57) ABSTRACT

A battery terminal (1) includes a main body (10) with upper and lower plates (20U, 20L). The upper plate (20U) includes an upper mounting hole (23U), and upper plate fastening portions (26U, 27U). The lower plate (20L) includes a lower mounting hole (23L) and lower plate fastening portions (26L, 27L). A first receiving wall (41A) is connected to a first upper plate fastening portion (26U) and engages a first lower plate fastening portion (26L). A second receiving wall (41B) is connected to the second upper plate fastening portion (27U) and engages the second lower plate fastening portion (27L). A bracket (70) is mounted on the main body (10) and has a first pressing portion (73A) with a first tapered surface (74A) to contact the first receiving wall (41A) and a second pressing portion (73B) with a second tapered surface (74B) to contact the second receiving wall (41B).

1 Claim, 14 Drawing Sheets

(51) Int. Cl.
*H01R 4/42* (2006.01)
*H01R 11/28* (2006.01)
*H01R 13/621* (2006.01)
*H01R 13/207* (2006.01)

(52) U.S. Cl.
CPC .......... *H01R 11/281* (2013.01); *H01R 11/283* (2013.01); *H01R 11/285* (2013.01); *H01R 13/207* (2013.01); *H01R 13/621* (2013.01)

(58) Field of Classification Search
USPC ................ 439/766, 765, 756, 726, 727, 500
See application file for complete search history.

(56) References Cited

FOREIGN PATENT DOCUMENTS

| | | |
|---|---|---|
| JP | 2004-186094 | 7/2004 |
| JP | 2004-186095 | 7/2004 |
| JP | 2004-186096 | 7/2004 |
| JP | 2004-235135 | 8/2004 |
| JP | 4225405 | 12/2008 |
| JP | 4225405 B2 * | 2/2009 |

* cited by examiner

BATTERY TERMINAL WITH UNINTENDED DEFORMATION PREVENTION FEATURES

BACKGROUND

1. Field of the Invention

The present invention relates to a battery terminal.

2. Description of the Related Art

A battery terminal is a member to be mounted on a battery post of a battery provided in a vehicle. A battery terminal manufactured by press-working one metal plate is disclosed in the Publication of Japanese Patent No. 4225405.

The battery terminal disclosed in the Publication of Japanese Patent No. 4225405 includes a terminal main body and a bracket. The terminal main body is formed by bending one metal plate and includes an upper base plate and a lower base plate arranged in parallel to each other, and two couplings that couple the upper and lower base plates. Each of the upper and lower base plates includes a battery post insertion hole. Each of the two couplings is U-shaped, with one end part linked to the upper base plate and the other end part linked to the lower base plate. Each of the two couplings includes a slide contact portion extending down from an upper side edge, and this slide contact portion has an inclined surface on a corner part connected to the upper base plate.

The bracket of the battery terminal disclosed in the Publication of Japanese Patent No. 4225405 includes a base plate to be fastened and fixed to an upper side portion using a bolt and a nut and two tapered portions obliquely extending from this base plate.

The bracket is fastened to the terminal main body using the bolt and the nut after a battery post is inserted into the battery post insertion holes. The two tapered portions then respectively slide in contact with the inclined surfaces provided on the respective two slide contact portions. Components of forces of the tapered portions pressing the inclined surfaces in a direction parallel to the upper and lower base plates move the two couplings in directions toward each other. The upper and lower base plates are deformed to reduce diameters of the battery post insertion holes and edges of the battery post insertion holes come into contact with the outer peripheral surface of the battery post. In this way, the battery terminal and the battery post are connected electrically.

However, in the above configuration, the pressing forces from the tapered portions concentrate on the corner parts where the inclined surfaces are arranged and the terminal main body may be deformed to spread upper side parts (parts connected to the upper base plate) of the couplings and the slide contact portions. If such a situation occurs, the pressing forces from the tapered portions are not transferred sufficiently to lower side parts (parts connected to the lower base plate) of the couplings. Thus, the battery post insertion hole of the lower base plate cannot be arrowed sufficiently narrowed and may not be sufficiently connected to the battery post.

To avoid such a situation, the battery terminal disclosed in the above literature is provided with spiral contact portions connected to the lower side parts of the couplings and configured to come into contact with the slide contact portions from inner sides. This complicates the structure of the terminal main body.

The present invention was completed based on the above situation and aims to provide a battery terminal capable of suppressing unintended deformation of a terminal main body and ensuring connection reliability with a battery post by a simple configuration.

SUMMARY

The invention is directed to a battery terminal to be mounted on a battery post on a battery. The battery terminal includes a terminal main body and a fastening member. The terminal main body includes an upper plate, a lower plate arranged parallel to the upper plate and first and second receiving portions connected to the upper plate. The upper plate includes an upper plate mounting hole, and the battery post is inserted through the upper plate mounting hole. An upper plate slit extends from an edge of the upper plate mounting hole to an end edge of the upper plate. A part arranged at one side of the upper plate slit is a first upper plate fastening portion and a part arranged at the other side is a second upper plate portion. The lower plate includes a lower plate mounting hole, and the battery post is inserted through the lower plate mounting hole. A lower plate slit extends from an edge of the lower plate mounting hole to an end edge of the lower plate. A part arranged at one side of the lower plate slit is a first lower plate fastening portion and a part arranged at the other side is a second lower plate. The first receiving portion includes a first receiving wall having an arcuate cross-section. The first receiving wall extends from an end edge of the first upper plate fastening portion on a side opposite to the second upper plate fastening portion toward the first lower plate fastening portion and has a convex surface on a side opposite to the one facing the first upper plate fastening portion and the first lower plate fastening portion. The second receiving portion includes a second receiving wall having an arcuate cross-section. The second receiving wall extends from an end edge of the second upper plate fastening portion on a side opposite to the first upper plate fastening portion toward the second lower plate fastening portion and has a convex surface on a side opposite to the one facing the second upper plate fastening portion and the second lower plate fastening portion. One of the first receiving portion and the first lower plate fastening portion includes a first engaging portion to be engaged with the other. Additionally, one of the second receiving portion and the second lower plate fastening portion includes a second engaging portion to be engaged with the other. The fastening member includes a base to be placed on the upper plate and a first pressing portion and a second pressing portion connected to the base. Surfaces of the first and second pressing portions facing each other are a first tapered surface and a second tapered surface inclined in directions to be more separated from each other with distance from the base. The first tapered surface is in contact with the first receiving portion and the second tapered surface is in contact with the second receiving portion.

According to the above-described configuration, the first receiving wall has an arcuate cross-section. Thus, a pressing force from the first pressing portion can be dispersed over the entire first receiving wall and spreading deformation of the first upper plate fastening portion and the first receiving wall can be suppressed. Further, the first receiving wall and the first lower plate fastening portion are engaged by the first engaging portion. Thus, a component of the pressing force by the first pressing portion applied to the first receiving wall in a direction parallel to the upper and lower plates can be transferred sufficiently transferred to the first upper plate fastening portion, and also to the first lower plate fastening portion. The same applies also to the second receiving wall and the second engaging portion. In this way, connection with the battery post can be ensured by sufficiently narrowing both the upper plate mounting hole and the lower plate mounting hole.

The first receiving portion may include a first overlapping portion to be placed on a surface of the first lower plate fastening portion facing the first upper plate fastening portion, and the second receiving portion may include a second overlapping portion to be placed on a surface of the second lower plate fastening portion facing the second upper plate fastening portion. According to this configuration, the first overlapping portion maintains an interval between the first upper plate fastening portion and the first lower plate fastening portion against a component of the pressing force by the first pressing portion applied to the first receiving wall in a direction perpendicular to the upper plate portion and the lower plate. The same applies also to the second overlapping portion. In this way, an effect of suppressing unintended deformation of the terminal main body is increased.

According to the present invention, it is possible to provide a battery terminal capable of suppressing unintended deformation of a terminal main body and ensuring connection reliability with a battery post by a simple configuration.

DETAILED DESCRIPTION

An embodiment of the present invention is described with reference to FIGS. 1 to 14. A battery terminal 1 of this embodiment is mounted on a battery post 100 provided on a battery (not shown) of a vehicle. The battery post 100 includes a cylindrical shaft 101 and a seat 102 arranged on one end of the shaft 101.

Figure 1:
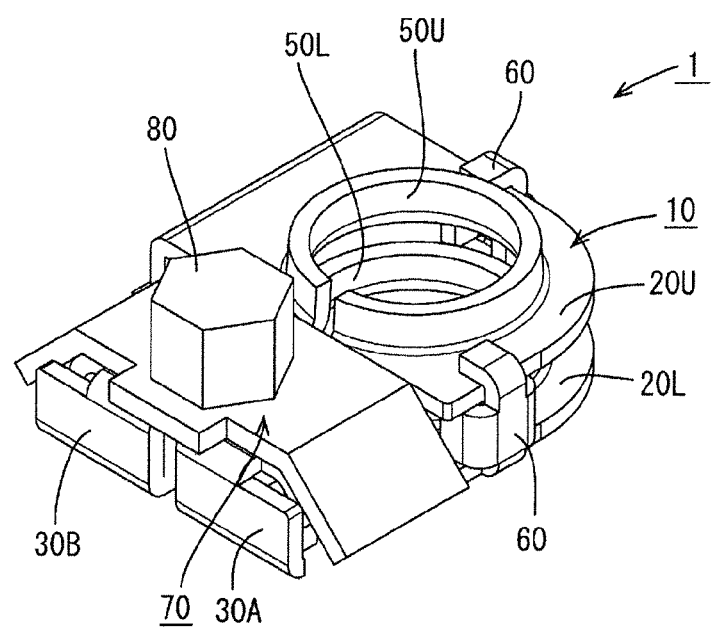
FIG. 1 is a perspective view of a battery terminal of an embodiment.
Figure 2:
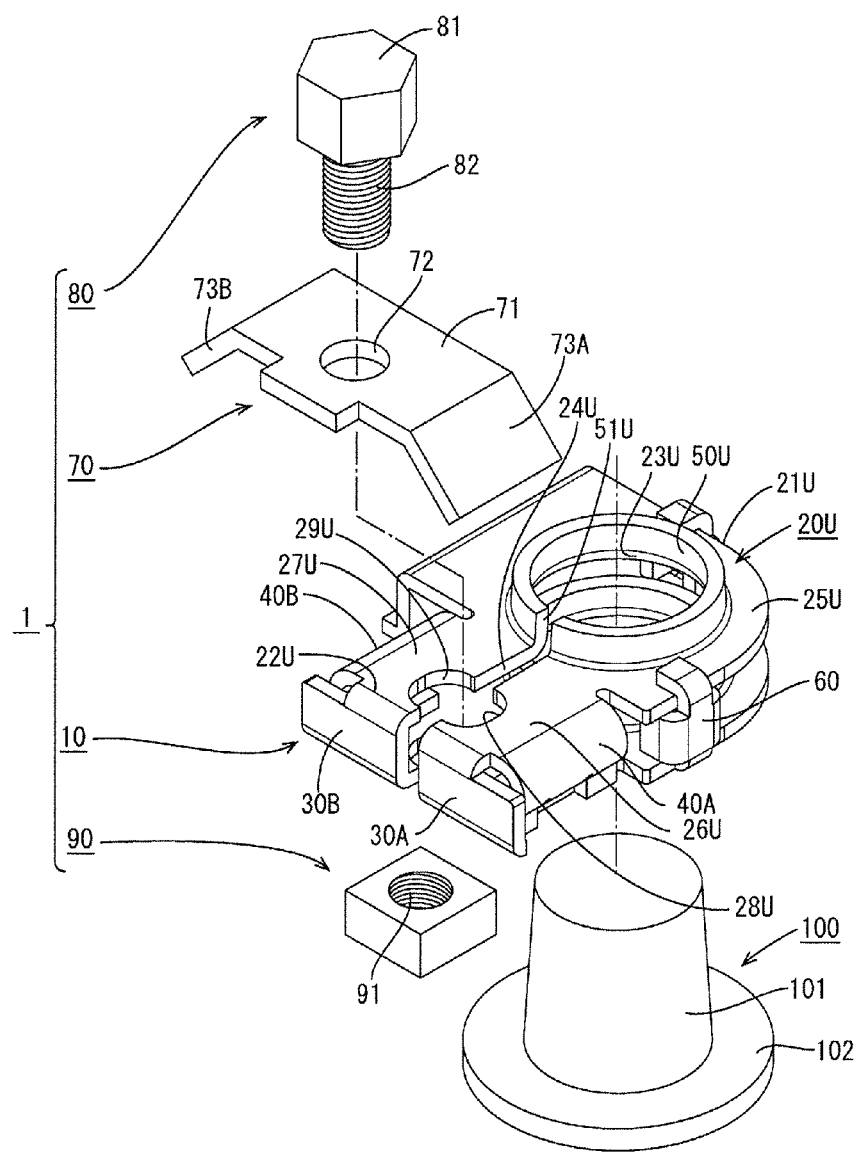
FIG. 2 is an exploded perspective view of the battery terminal and a battery post of the embodiment.

As shown in FIGS. 1 and 2, the battery terminal 1 includes a terminal main body 10, a bracket 70 (corresponding to a fastening member), a bolt 80 and a nut 90.

The terminal main body 10 includes an upper plate 20U, a lower plate 20L, first and second couplings 30A, 30B, first and second receiving portions 40A, 40B, upper and lower mounting tubes 50U, 50L and a plurality of stoppers 60.

As shown in FIG. 2, the upper plate 20U is a plate-like part long in one direction and has first and second short sides 21U, 22U perpendicular to a length direction. The upper plate 20U is arranged perpendicular to an axial direction of the shaft 101 of the battery post 100.

The upper plate 20U includes an upper plate mounting hole 23U and an upper plate slit 24U. The upper plate mounting hole 23U penetrates from one surface to the other surface of the upper plate 20U, and the shaft 101 is inserted. The upper plate mounting hole 23U is arranged proximate to the first short side 21U of the upper plate 20U. The upper plate mounting hole 23U has an inner diameter slightly larger than an outer diameter of the shaft 101 in a free state where the battery terminal 1 is not mounted on the battery post 100.

The upper plate slit 24U is a clearance extending from an edge of the upper plate mounting hole 23U to the second short side 22U (corresponding to an end edge), which is more distant from the upper plate mounting hole 23U along the length direction of the upper plate 20U. By the presence of this upper plate slit 24U, a part of the upper plate 20U between the upper plate mounting hole 23U and the second short side 22U is divided into two parts.

A part of the upper plate 20U surrounding the upper plate mounting hole 23U is an upper plate mounting portion 25U. One of the two parts arranged across the upper plate slit 24U is a first upper plate fastening portion 26U and the other is a second upper plate fastening portion 27U.

The first upper plate fastening portion 26U has a halved recess 28U. The halved recess 28U is recessed from an end surface of the first upper plate fastening portion 26U facing the second upper plate fastening portion 27U in a direction away from the second upper plate fastening portion 27U. The second upper plate fastening portion 27U also similarly has a halved recess 29U. The halved recess 29U is recessed from an end surface of the second upper plate fastening portion 27U facing the first upper plate fastening portion 26U in a direction away from the first upper plate fastening portion 26U. The two halved recesses 28U, 29U are arranged to face each other, and a space enclosed by the two halved recesses 28U, 29U serves as a space for the insertion of the bolt 80.

Figure 4:
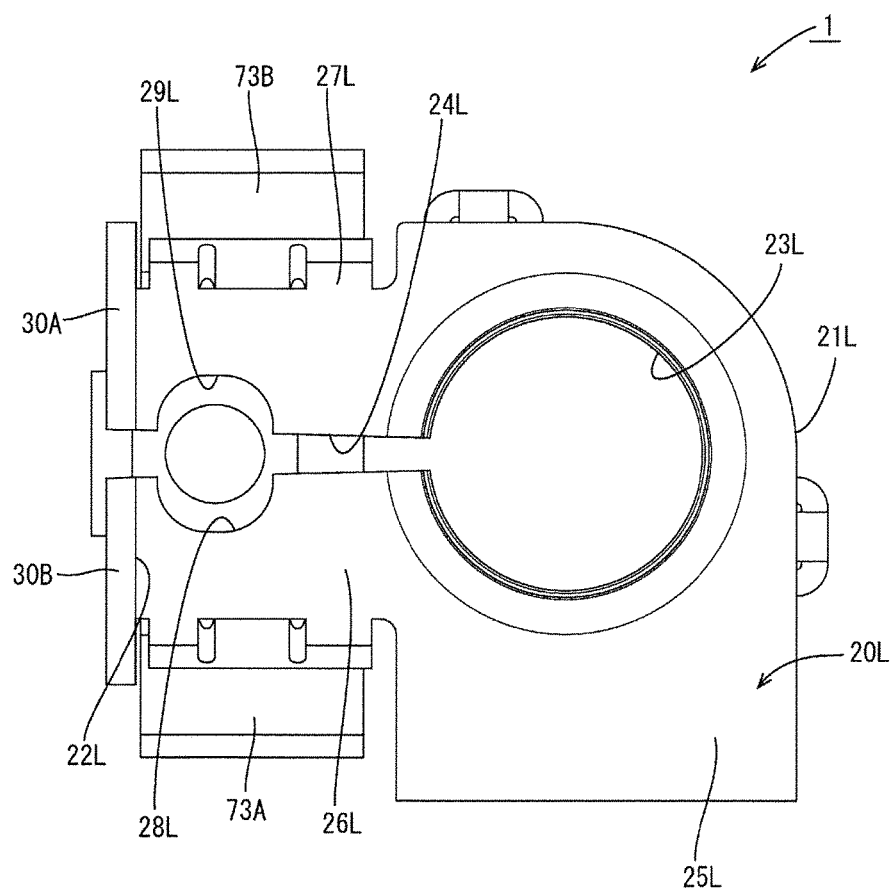
FIG. 4 is a bottom view of the battery terminal of the embodiment.
Figure 5:
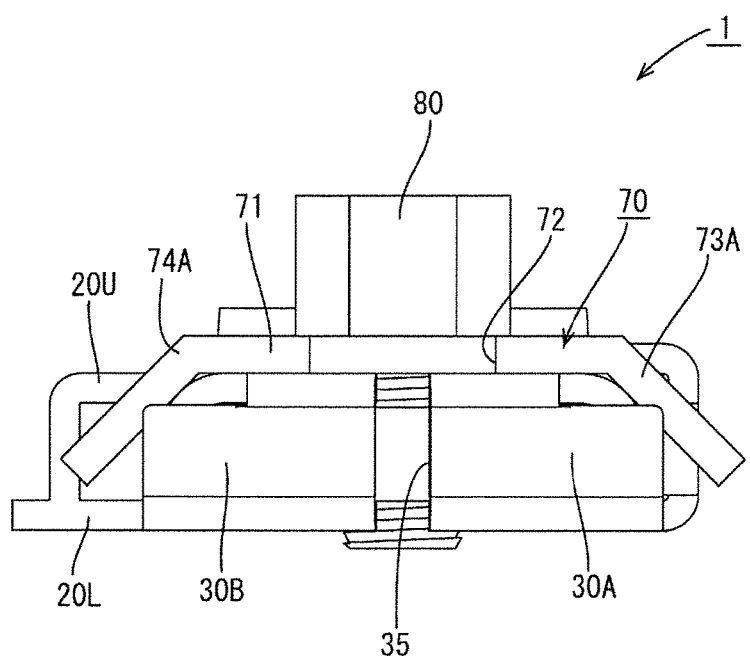
FIG. 5 is a front view of the battery terminal of the embodiment.
Figure 6:
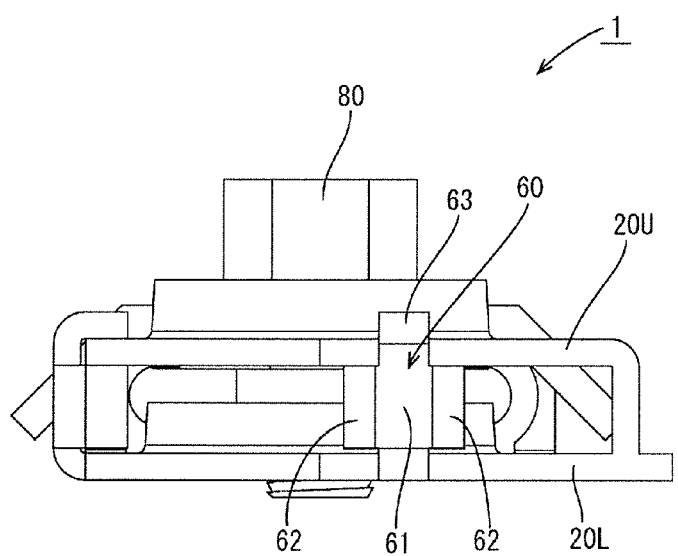
FIG. 6 is a rear view of the battery terminal of the embodiment.
Figure 7:
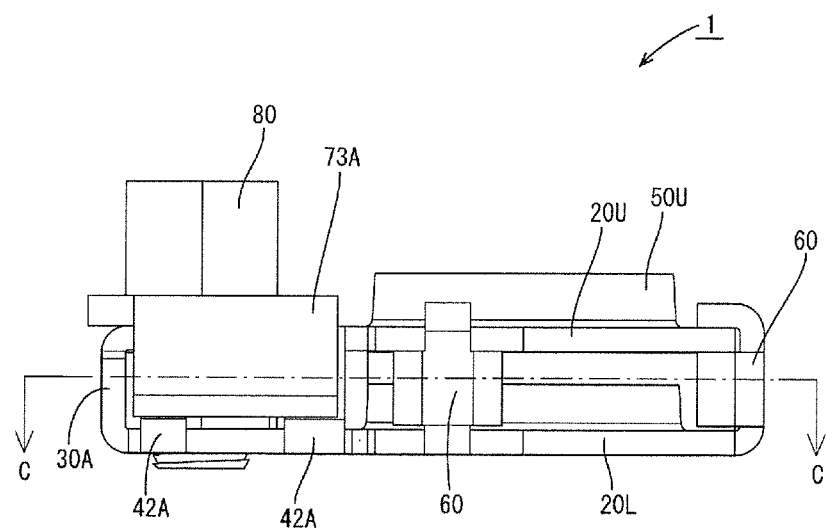
FIG. 7 is a right side view of the battery terminal of the embodiment.
Figure 8:
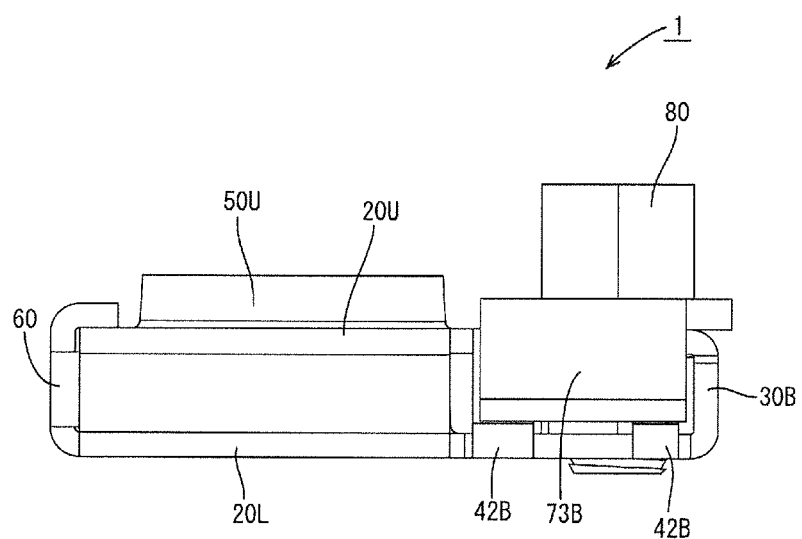
FIG. 8 is a left side view of the battery terminal of the embodiment.

As shown in FIG. 4, the lower plate 20L has an outer shape similar to the upper plate portion 20U and has first and second short sides 21L, 22L perpendicular to a length direction. The lower plate 20L is arranged parallel to and at a distance from the upper plate 20UAs.

As shown in FIG. 4, the lower plate 20L includes a lower plate mounting hole 23L and a lower plate slit 24L. The lower plate mounting hole 23L is shaped similar to the upper plate mounting hole 23U and is arranged proximate to the first short side 21L of the lower plate 20L. The lower plate slit 24U is a clearance extending from an edge of the lower plate mounting hole 23L to the second short side 22L (corresponding to an end edge) more distant from the lower plate mounting hole 23L along the length direction of the lower plate 20L. By the presence of this lower plate slit 24L, a part of the lower plate 20L between the lower plate mounting hole 23L and the second short side 22L is divided into two parts.

Similar to the upper plate 20U, a part of the lower plate 20L surrounding the lower plate mounting hole 23L is a lower plate mounting portion 25L. Further, out of the two parts arranged across the lower plate slit 24L, the part arranged on the same side as the first upper plate fastening portion 26U is a first lower plate fastening portion 26L and the part arranged on the same side as the second upper plate fastening portion 27U is a second lower plate fastening portion 27L. The first and second lower plate fastening portions 26L, 27L respectively have halved recesses 28L, 29L similarly to the first and second upper plate fastening portions 26U, 27U, and a space enclosed by the two halved recesses 28L, 29L serves as a space for the insertion of the bolt 80.

When viewed in a direction perpendicular to plate surfaces of the upper plate 20U and the lower plate 20L, the upper plate mounting hole 23U and the lower plate mounting hole 23L are arranged to overlap each other, the upper plate slit 24U and the lower plate slit 24L are arranged to overlap each other and the halved recesses 28U, 29U of the upper plate 20U and the halved recesses 28L, 29L of the lower plate 20L are arranged to overlap each other.

The first coupling 30A couples an end edge of the first upper plate fastening portion 26U on a side opposite to the upper plate mounting portion 25U and an end edge of the first lower plate fastening portion 26L on a side opposite to the lower plate mounting portion 25L. The second coupling 30B couples an end edge of the second upper plate fastening portion 27U on a side opposite to the upper plate mounting portion 25U and an end edge of the second lower plate fastening portion 27L on a side opposite to the lower plate mounting portion 25L. A clearance is present between the first and second couplings 30A, 30B and this clearance defines a coupling slit 35 communicating with the upper plate slit 24U and the lower plate slit 24L.

Figure 9:
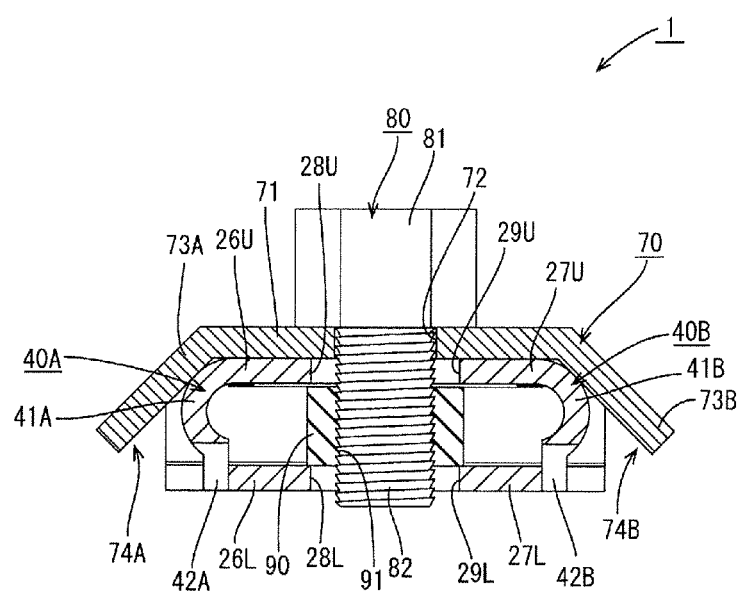
FIG. 9 is a section along A-A of FIG. 3.

The first receiving portion 40A includes a first receiving wall 41A, two first engaging portions 42A and a first overlapping portion 43A. As shown in FIG. 9, the first receiving wall 41A extends from an outer side edge (side edge on a side opposite to the second upper plate fastening portion 27U) of the first upper plate fastening portion 26U toward the first lower plate fastening portion 26L. The first receiving portion 40A has an arcuate cross-section when viewed in an extending direction of the upper plate slit 24U and the lower plate slit 24L and a convex surface faces out (side opposite to the one facing the first upper plate fastening portion 26U and the first lower plate fastening portion 26L).

Figure 11:
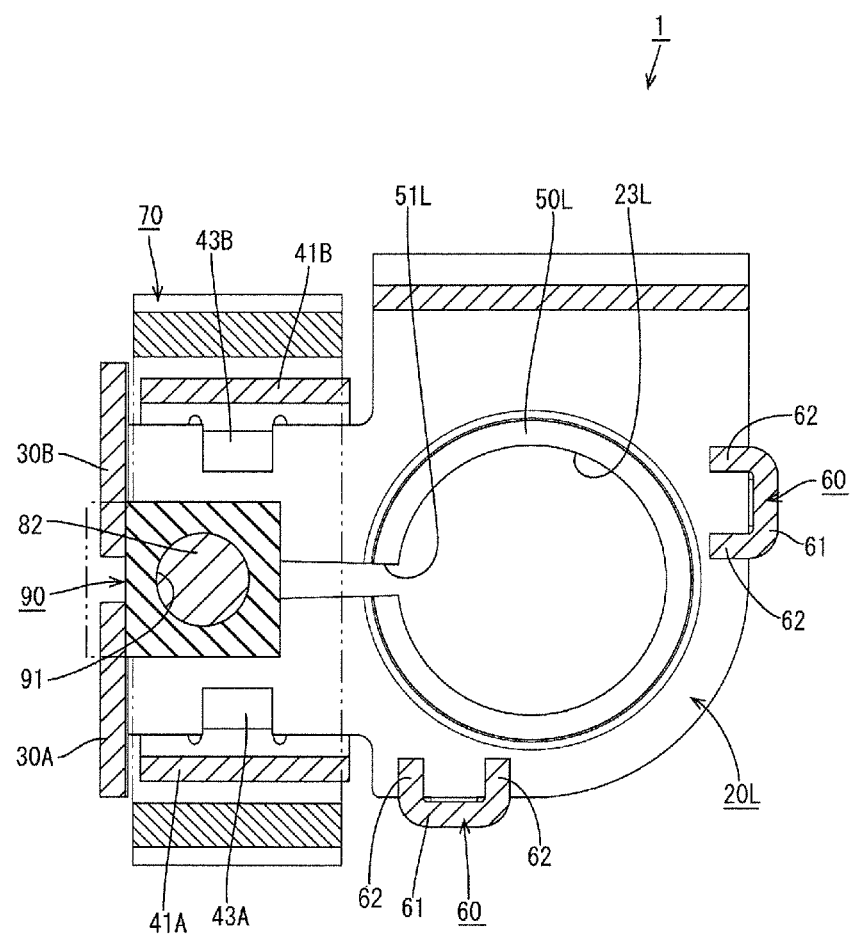
FIG. 11 is a section along C-C of FIG. 7.
Figure 12:
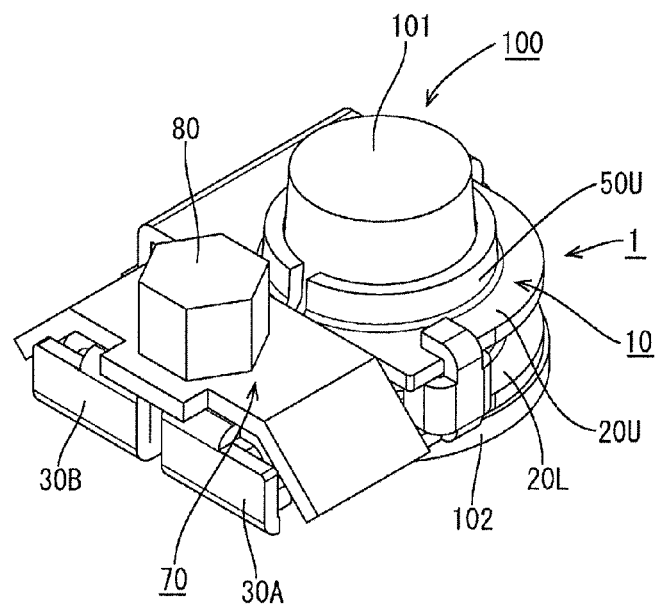
FIG. 12 is a perspective view showing a state where the battery terminal of the embodiment is mounted on the battery post.

Each of the two first engaging portions 42A and the first overlapping portion 43A is connected to an end edge of the first receiving portion 41A proximate to the first lower plate fastening portion 26L. As shown in FIG. 9, each of the two first engaging portions 42A is a plate-like part extending perpendicular to the first lower plate fastening portion 26L and in contact with an end surface of the first lower plate fastening portion 26L on a side opposite to the second lower plate fastening portion 27L. As shown in FIG. 11, the first overlapping portion 43A is a plate-like part extending parallel to the first lower plate fastening portion 26L and to be placed on a surface of the first lower plate fastening portion 26L facing the first upper plate fastening portion 26U. The two first engaging portions 42A are arranged at opposite sides of the first overlapping portion 43A.

The second receiving portion 40B includes a second receiving wall 41B, two second engaging portions 42B and a second overlapping portion 43B. As shown in FIG. 9, the second receiving wall 41B extends from an outer side edge (side edge on a side opposite to the first upper plate fastening portion 26U) of the second upper plate fastening portion 27U toward the second lower plate fastening portion 27L. The second receiving portion 40B has an arcuate cross-section when viewed in the extending direction of the upper plate slit 24U and the lower plate slit 24L and a convex surface faces out (side opposite to the one facing the second upper plate fastening portion 27U and the second lower plate fastening portion 27L).

The two second engaging portions 42B and the second overlapping portion 43B are connected to an end edge of the second receiving portion 41B proximate to the second lower plate fastening portion 27L. As shown in FIG. 9, each of the two second engaging portions 42B is a plate-like part extending perpendicular to the second lower plate fastening portion 27L and in contact with an end surface of the second lower plate fastening portion 27L on a side opposite to the first lower plate fastening portion 26L. As shown in FIG. 11, the second overlapping portion 43B is a plate-like part extending parallel to the second lower plate fastening portion 27L and to be placed on a surface of the second lower plate fastening portion 27L facing the second upper plate fastening portion 27U. The two second engaging portions 42B are arranged at opposite sides of the second overlapping portion 43B.

Figure 3:
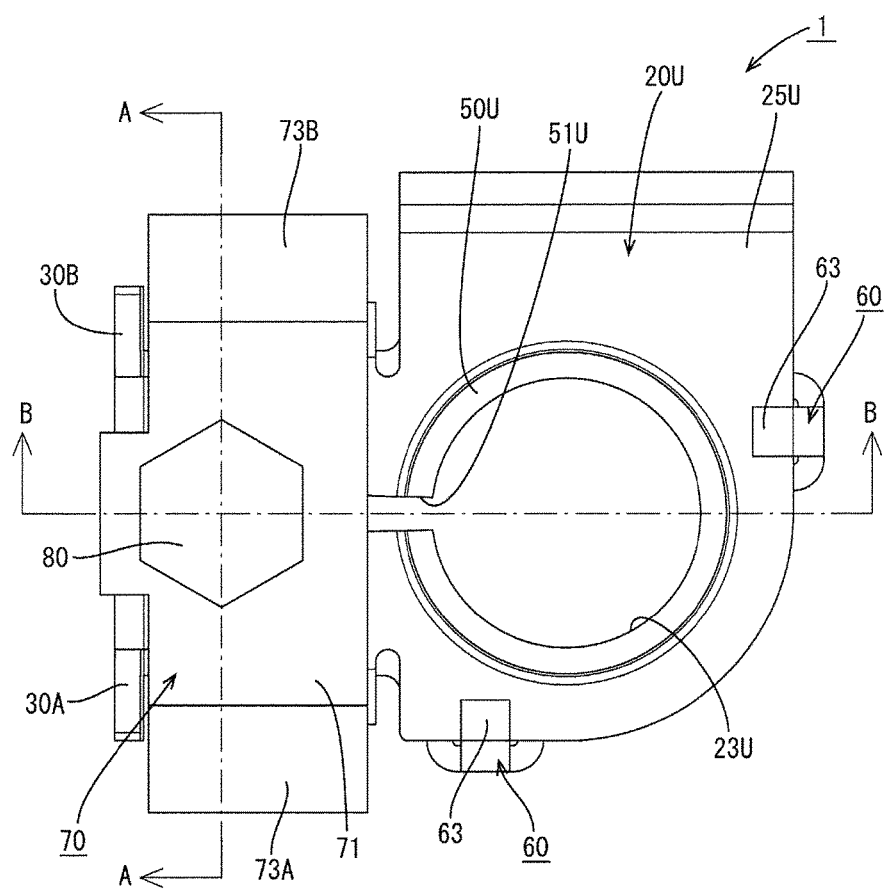
FIG. 3 is a plan view of the battery terminal of the embodiment.
Figure 10:
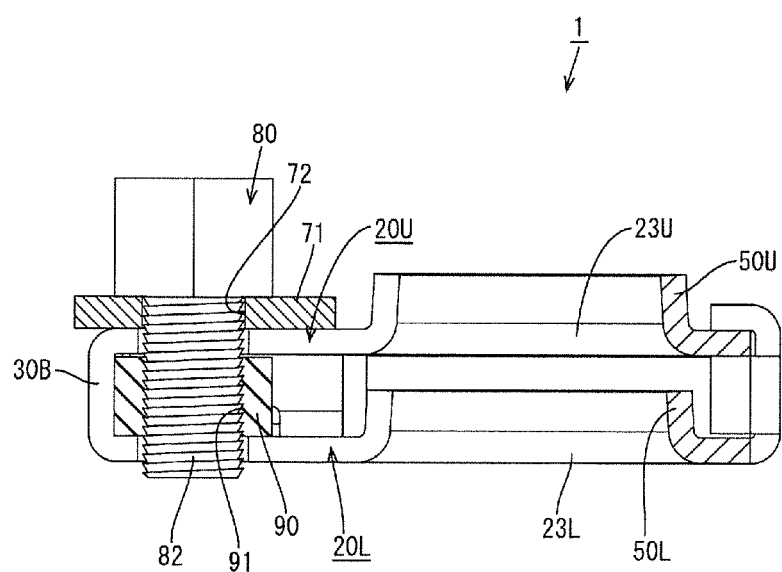
FIG. 10 is a section along B-B of FIG. 3.

As shown in FIGS. 2, 3 and 10, the upper plate mounting tube 50U is a tubular part extending from an edge of the upper plate mounting hole 23U in a direction perpendicular to the upper plate 20U and away from the lower plate 20L. The upper plate mounting tube 50U includes an upper tube slit 51U. The upper tube slit 51U is a clearance communicating with the upper plate slit 24U and extending to an end edge of the upper plate mounting tube 50U on a side opposite to the upper plate 20U. By the presence of this upper tube slit 51U, the upper plate mounting tube 50U is a tube including a cut and having a C-shaped cross-section.

As shown in FIGS. 10 and 11, the lower plate mounting tube 50L is a tubular part extending from an edge of the lower plate mounting hole 23L in a direction perpendicular to the lower plate 20L and toward the upper plate 20U. The lower plate mounting tube 50L includes a lower tube slit 51L. The lower tube slit 51L is a clearance communicating with the lower plate slit 24L and extending to an end edge of the lower plate mounting tube 50L on a side opposite to the lower plate 20L. By the presence of this lower tube slit 51L, the lower plate mounting tube 50L is a tube including a cut and having a C-shaped cross-section.

The stoppers 60 are parts for holding the upper plate mounting 25U and the lower plate mounting 25L while maintaining a predetermined interval. As shown in FIGS. 2, 3, 6 and 11, each stopper 60 includes a main piece 61 extending from an end edge of the lower plate mounting portion 25L toward the upper plate mounting portion 25U, holding pieces 62 connected to the main piece 61 and sandwiched between the upper plate mounting portion 25U and the lower plate mounting portion 25L and a locking piece 63 connected to the main piece 61 and extending along a plate surface of the upper plate mounting portion 25U on a side opposite to the lower plate mounting portion 25L.

The bracket 70 is to be mounted on the terminal main body 10 by the bolt 80 and the nut 90 for deforming the terminal main body 10 to reduce diameters of the upper plate mounting hole 23U and the lower plate mounting hole 23L. As shown in FIG. 2, the bracket 70 includes a base 71 and first and second pressing portions 73A, 73B.

The base 71 is a rectangular plate and a part to be placed on surfaces of the first upper plate fastening portion 26U and the second upper plate fastening portion 27U on a side opposite to the lower plate 20L. A distance between two sides of the base 71 parallel to the upper plate slit 24U is shorter than a distance between the outer end edge of the first upper plate fastening portion 26U and that of the second upper plate fastening portion 27U. The base 71 includes a bolt insertion hole 72 penetrating from a surface facing the upper plate 20U to an opposite surface thereof.

The first pressing portion 73A is a plate-like part extending toward the terminal main body 10 from the side of the base 71 that is closer to the first upper plate fastening portion 26U and that is parallel to the upper plate slit 24U. The second pressing portion 73B is a plate-like part extending toward the terminal main body 10 from the side of the base 71 that is closer to the second upper plate fastening portion 27U and that is parallel to the upper plate slit 24U.

The first and second pressing portions 73A, 73B are respectively inclined in directions to be more separated from each other with distance from the base 71. As shown in FIG. 9, surfaces of the first and second pressing portions 73A, 73B facing each other are respectively a first tapered surface 74A and a second tapered surface 74B inclined in directions to be more separated from each other with distance from the base 71. The first and second pressing portions 73A, 73B respectively press the first and second receiving walls 41A, 41B toward each other by bringing the first and second tapered surfaces 74A, 74B into contact with the first and second receiving walls 41A, 41B.

The bolt 80 has a general shape including a head 81 and a trunk 82 having an external thread on an outer peripheral surface.

The nut 90 is a square nut in the form of a rectangular block and has a nut hole 91. As shown in FIG. 2, the nut hole 91 penetrates from one surface to the opposite surface of the nut 90 and has a thread groove on an inner peripheral surface. The nut 90 is arranged between the first and second upper plate fastening portions 26U, 27U and the first and second lower plate fastening portions 26L, 27L.

The trunk 82 of the bolt 80 is inserted into the bolt insertion hole 72 and the space closed by the two halved recesses 28U, 29U of the upper plate 20U and screwed into the nut 90 so that the bracket 70 is fixed to the terminal main body 10.

Next, the procedure of mounting the battery terminal 1 configured as described above on the battery post 100 is described.

The shaft 101 of the battery post 100 is inserted into the upper plate mounting hole 23U and the lower plate mounting hole 23L of the terminal main body 10. Further, the nut 90 is set between the first and second upper plate fastening portions 26U, 27U and the first and second lower plate fastening portions 26L, 27L. Subsequently, the bracket 70 is placed on the terminal main body 10. In a state where the bracket 70 is not screwed to the terminal main body 10, the first and second pressing portions 73A, 73B respectively contact the first and second receiving walls 41A, 41B and the base 71 is lifted slightly from the first and second upper plate fastening portions 26U, 27U.

In this state, the bolt 80 is inserted into the bolt insertion hole 72 and screwed into the nut 90. As the bolt 80 is tightened into the nut 90, the base 71 is pressed by the head 81 of the bolt 80 to move toward the first and second upper plate fastening portions 26U, 27U. Then, the first and second receiving walls 41A, 41B move in directions toward the base 71 (i.e. directions to narrow the interval between the first and second pressing portions 73A, 73B) while sliding in contact with the first pressing portion 73A and the first pressing portion 73B. In this way, the first and second receiving walls 41A, 41B move toward each other.

A component of a pressing force of the first pressing portion 73A applied to the first receiving wall 41A in a direction parallel to the upper plate 20U and the lower plate 20L is transferred to the first upper plate fastening portion 26U and the first lower plate fastening portion 26L so that both move in directions toward the second upper plate fastening portion 27U and the second lower plate fastening portion 27L. Similarly, the second upper plate fastening portion 27U and the second lower plate fastening portion 27L also move in directions toward the first upper plate fastening portion 26U and the first lower plate fastening portion 26L.

Figure 13:
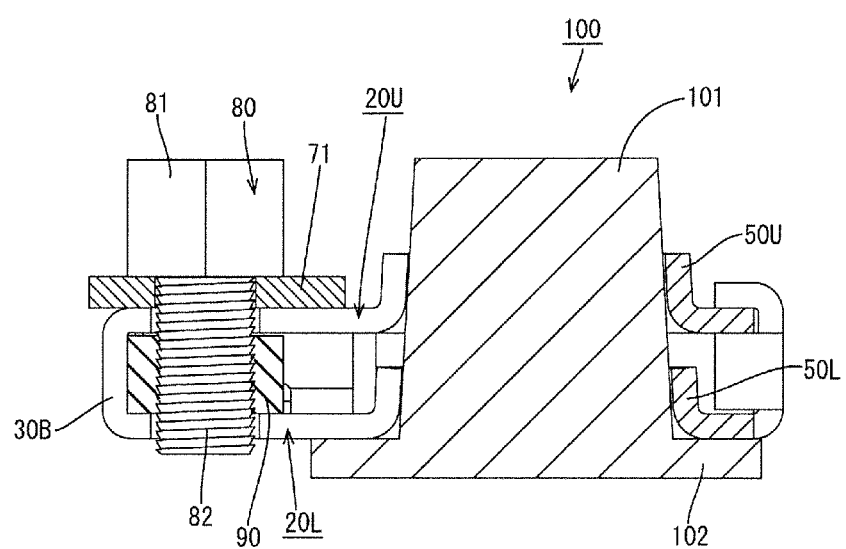
FIG. 13 is a section cut at the same position as B-B of FIG. 3 showing the battery terminal of the embodiment mounted on the battery post.
Figure 14:
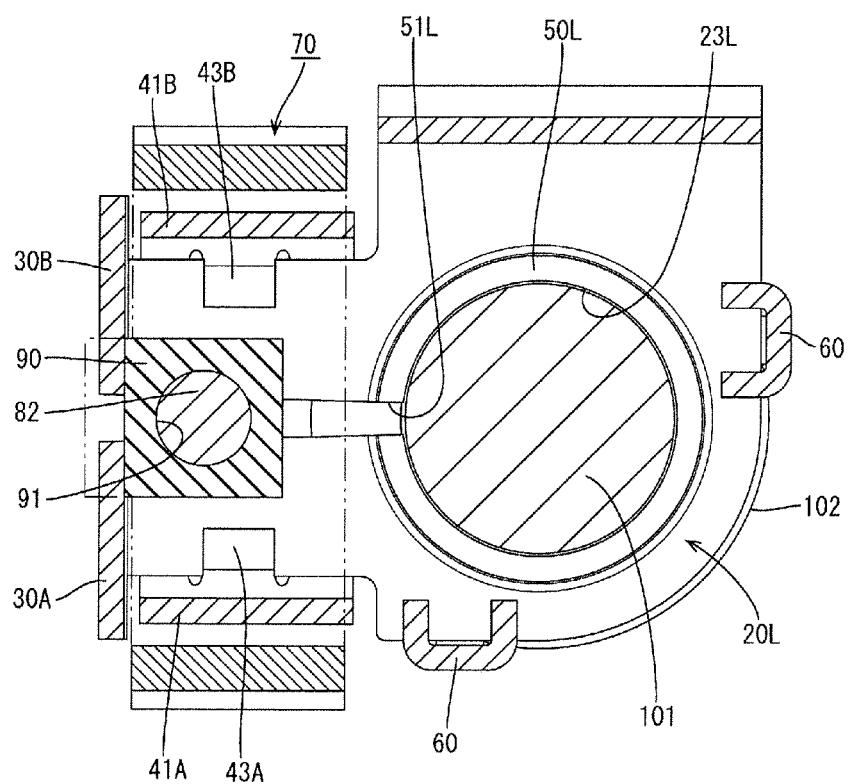
FIG. 14 is a section cut at the same position as C-C of FIG. 7 the battery terminal of the embodiment mounted on the battery post.

In this way, the diameters of the upper plate mounting hole 23U and the lower plate mounting hole 23L are reduced and the inner peripheral surfaces of the upper plate mounting hole 23U, the lower plate mounting hole 23L, the upper plate mounting tube portion 50U and the lower plate mounting tube portion 50L are held in close contact with the outer peripheral surface of the shaft 101 of the battery post 100 as shown in FIGS. 13 and 14. In this way, the battery terminal 100 and the battery terminal 1 are connected electrically conductively.

In this embodiment, the first receiving wall 41A has an arcuate cross-section. Thus, the pressing force from the first pressing portion 73A can be dispersed over the entire first receiving wall 41A and spreading deformation of the first upper plate fastening portion 26U and the first receiving wall 41A can be suppressed. Further, the first engaging portions 42A are configured to come into contact with the first lower plate fastening portion 26L and are arranged on the end edge of the first receiving wall 41A. Thus, the component of the pressing force by the first pressing portion 73A applied to the first receiving wall 41A in the direction parallel to the upper and lower plates 20U and 20L can be transferred sufficiently to both the first upper plate fastening portion 26U and the first lower plate fastening portion 26L. The same applies to the second receiving wall 41B and the second engaging portions 42B. In this way, the connection of the battery terminal 1 and the battery post 100 can be ensured by sufficiently narrowing both the upper plate mounting hole 23U and the lower plate mounting hole 23L.

Further, the first receiving wall 41A has an arcuate cross-section. Thus, the first receiving wall 41A smoothly moves toward the base 71 while sliding in contact with the first pressing portion 73A and the battery terminal 1 can be mounted smoothly to the battery post 100.

In addition, the first overlapping portion 43A maintains the interval between the first upper plate fastening portion 26U and the first lower plate fastening portion 26L against a component of the pressing force by the first pressing portion 73A applied to the first receiving wall 41A in a direction perpendicular to the upper plate 20U and the lower plate 20L. The same applies to the second overlapping portion 43B. In this way, an effect of suppressing unintended deformation of the terminal main body 10 is increased.

The invention is not limited to the above described and illustrated embodiment. For example, the following embodiments also are included in the scope of the invention.

Although two first engaging portions 42A are arranged at opposite sides of one first overlapping portion 43A in the above embodiment, the numbers and arrangement of the first engaging portion(s) and the first overlapping portion(s) are not particularly limited. The same applies also to the second engaging portion(s) and the second overlapping portion(s).

Although the first engaging portions 42A are provided on the first receiving wall 40A and engaged with the first lower plate fastening portion 26L in the above embodiment, the first engaging portion(s) may be provided on the first lower plate fastening portion and engaged with the first receiving portion.

LIST OF REFERENCE SIGNS

1 . . . battery terminal
10 . . . terminal main body
20U . . . upper plate portion
22U . . . short side (end edge)
23U . . . upper plate mounting hole
24U . . . upper plate slit
26U . . . first upper plate fastening portion
27U . . . second upper plate fastening portion
20L . . . lower plate portion
22L . . . short side (end edge)
23L . . . lower plate mounting hole
24L . . . lower plate slit
26L . . . first lower plate fastening portion
27L . . . second lower plate fastening portion
40A . . . first receiving portion
41A . . . first receiving wall
42A . . . first engaging portion
43A . . . first overlapping portion
40B . . . second receiving portion
41B . . . second receiving wall
42B . . . second engaging portion
43B . . . second overlapping portion
70 . . . bracket (fastening member)
71 . . . base portion
73A . . . first pressing portion
74A . . . first tapered surface
73B . . . second pressing portion
74B . . . second tapered surface
100 . . . battery post

The invention claimed is:

1. A battery terminal to be mounted on a battery post provided on a battery, comprising a terminal main body and a fastening member, wherein:
the terminal main body includes an upper plate, a lower plate arranged parallel to the upper plate and first and second receiving portions connected to the upper plate;
the upper plate includes an upper plate mounting hole, the battery post being inserted through the upper plate mounting hole, and an upper plate slit extending from an edge of the upper plate mounting hole to an end edge of the upper plate, a part arranged at a first side of the upper plate slit is a first upper plate fastening portion and a part arranged at a second side is a second upper plate fastening portion;
the lower plate includes a lower plate mounting hole, the battery post being inserted through the lower plate mounting hole, and a lower plate slit extending from an edge of the lower plate mounting hole to an end edge of the lower plate, a part arranged at a first side of the lower plate slit is a first lower plate fastening portion and a part arranged at a second side is a second lower plate fastening portion;
the first receiving portion includes a first receiving wall, a first engaging portion and a first overlapping portion;
the first receiving wall has an arcuate cross-section, extends from an end edge of the first upper plate fastening portion on a side opposite to the second upper plate fastening portion toward the first lower plate fastening portion and has a convex surface on a side opposite to a side facing the first upper plate fastening portion and the first lower plate fastening portion;
the first engaging portion is connected to an end edge of the first receiving wall proximate to the first lower plate fastening portion, extends perpendicularly to the first lower plate fastening portion and is in contact with an end surface of the first lower plate fastening portion;
the first overlapping portion is connected to the end edge of the first receiving wall proximate to the first lower plate fastening portion, extends in parallel to the first lower plate fastening portion and is placed on a surface facing the first upper plate fastening portion;
the second receiving portion includes a second receiving wall, a second engaging portion and a second overlapping portion;
the second receiving wall has an arcuate cross-section, extends from an end edge of the second upper plate fastening portion on a side opposite to the first upper plate fastening portion toward the second lower plate fastening portion and has a convex surface on a side opposite to a side facing the second upper plate fastening portion and the second lower plate fastening portion;
the second engaging portion is connected to an end edge of the second receiving wall proximate to the second lower plate fastening portion, extends perpendicular to the second lower plate fastening portion and is in contact with an end surface of the second lower plate fastening portion;
the second overlapping portion is connected to the end edge of the second receiving wall proximate to the second lower plate fastening portion, extends parallel to the second lower plate fastening portion and is placed on a surface facing the second upper plate fastening portion;
a nut is arranged between the first and second upper plate fastening portions and the first and second lower plate fastening portions;
the fastening member includes a base to be placed on the upper plate portion and a first pressing portion and a second pressing portion connected to the base;
surfaces of the first and second pressing portions facing each other are a first tapered surface and a second tapered surface inclined in directions to be more separated from each other with distance from the base; and
the first tapered surface is in contact with the first receiving portion and the second tapered surface is in contact with the second receiving portion.

* * * * *